(12) United States Patent
Stiesdal

(10) Patent No.: US 8,138,621 B2
(45) Date of Patent: Mar. 20, 2012

(54) WIND ENERGY INSTALLATION AND METHOD OF CONTROLLING THE OUTPUT POWER FROM A WIND ENERGY INSTALLATION

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/009,345

(22) Filed: Jan. 19, 2011

(65) Prior Publication Data

US 2011/0109086 A1    May 12, 2011

Related U.S. Application Data

(63) Continuation of application No. 11/975,333, filed on Oct. 18, 2007, now Pat. No. 7,898,099.

(30) Foreign Application Priority Data

Oct. 19, 2006    (EP) ...................... 06021972

(51) Int. Cl.
*F03D 9/00* (2006.01)
*H02P 9/04* (2006.01)
*F02D 29/06* (2006.01)
(52) U.S. Cl. .......... 290/44; 290/40 B; 290/40 D; 290/55
(58) Field of Classification Search ................ 290/40 B, 290/40 D, 44, 55
See application file for complete search history.

(56) References Cited

U.S. PATENT DOCUMENTS

| | | | | | |
|---|---|---|---|---|---|
| 4,060,752 | A | * | 11/1977 | Walker | 315/244 |
| 4,346,332 | A | * | 8/1982 | Walden | 315/307 |
| 4,475,074 | A | * | 10/1984 | Reng | 318/800 |
| 4,613,807 | A | * | 9/1986 | Hosemann | 318/807 |
| 4,695,736 | A | * | 9/1987 | Doman et al. | 290/44 |
| 4,700,081 | A | * | 10/1987 | Kos et al. | 290/44 |
| 5,225,712 | A | * | 7/1993 | Erdman | 290/44 |
| 5,729,118 | A | * | 3/1998 | Yanagisawa et al. | 322/29 |
| 6,366,864 | B1 | * | 4/2002 | Kulidjian et al. | 702/60 |
| 6,420,795 | B1 | * | 7/2002 | Mikhail et al. | 290/44 |
| 6,891,281 | B2 | * | 5/2005 | Wobben | 290/44 |
| 7,180,202 | B2 | * | 2/2007 | Wobben | 290/44 |
| 7,245,801 | B2 | * | 7/2007 | Boyd et al. | 385/27 |
| 7,345,373 | B2 | * | 3/2008 | Delmerico et al. | 290/44 |
| 7,372,174 | B2 | * | 5/2008 | Jones et al. | 290/44 |
| 7,432,686 | B2 | * | 10/2008 | Erdman et al. | 322/44 |
| 7,511,385 | B2 | * | 3/2009 | Jones et al. | 290/43 |
| 7,528,496 | B2 | * | 5/2009 | Fortmann | 290/44 |
| 7,656,052 | B2 | * | 2/2010 | Jones et al. | 290/43 |
| 7,660,135 | B2 | * | 2/2010 | Fang | 363/17 |
| 7,679,208 | B1 | * | 3/2010 | Ko et al. | 290/44 |
| 7,692,321 | B2 | * | 4/2010 | Jones et al. | 290/43 |
| 7,755,209 | B2 | * | 7/2010 | Jones et al. | 290/44 |
| 7,761,190 | B2 | * | 7/2010 | Delmerico et al. | 700/297 |
| 7,769,552 | B2 | * | 8/2010 | Colby et al. | 702/65 |
| 7,786,608 | B2 | * | 8/2010 | Menke | 290/44 |
| 7,800,242 | B2 | * | 9/2010 | Stiesdal | 290/44 |

(Continued)

*Primary Examiner* — Tulsidas C Patel

(57) ABSTRACT

A wind energy installation and a method of controlling the output power from a wind energy installation to an electrical grid with a specified nominal grid frequency are provided, in which the output power is controlled as a function of the time derivative of the grid frequency.

9 Claims, 3 Drawing Sheets

U.S. PATENT DOCUMENTS

| | | |
|---|---|---|
| 7,852,467 B2 * | 12/2010 | Boroditsky et al. .......... 356/73.1 |
| 7,898,099 B2 * | 3/2011 | Stiesdal ............................ 290/44 |
| 7,956,993 B2 * | 6/2011 | Boroditsky et al. .......... 356/73.1 |
| 2005/0122083 A1 * | 6/2005 | Erdman et al. ................... 322/20 |
| 2006/0119105 A1 * | 6/2006 | Kang et al. ...................... 290/44 |
| 2006/0273595 A1 * | 12/2006 | Avagliano et al. .............. 290/44 |
| 2007/0108771 A1 * | 5/2007 | Jones et al. ...................... 290/44 |
| 2007/0120369 A1 * | 5/2007 | Delmerico et al. .............. 290/44 |
| 2007/0121354 A1 * | 5/2007 | Jones et al. ...................... 363/47 |
| 2008/0007121 A1 * | 1/2008 | Erdman et al. ................... 307/47 |
| 2008/0093856 A1 * | 4/2008 | Stiesdal ............................ 290/44 |
| 2008/0111380 A1 * | 5/2008 | Delmerico et al. .............. 290/44 |
| 2009/0067286 A1 * | 3/2009 | Bose et al. ....................... 367/38 |
| 2009/0134845 A1 * | 5/2009 | Czajkowski ..................... 322/28 |
| 2010/0066086 A1 * | 3/2010 | Ko et al. .......................... 290/44 |
| 2010/0072817 A1 * | 3/2010 | Hirst ................................ 307/31 |
| 2010/0123314 A1 * | 5/2010 | Menke .............................. 290/44 |
| 2010/0142237 A1 * | 6/2010 | Yuan et al. ....................... 363/97 |
| 2010/0182809 A1 * | 7/2010 | Cullinane et al. ............... 363/34 |
| 2010/0197254 A1 * | 8/2010 | Yu et al. ...................... 455/179.1 |
| 2010/0238690 A1 * | 9/2010 | Krein et al. ...................... 363/40 |
| 2010/0320762 A1 * | 12/2010 | Letas et al. ....................... 290/44 |
| 2011/0012352 A1 * | 1/2011 | Nelson et al. .................... 290/44 |
| 2011/0051126 A1 * | 3/2011 | Boroditsky et al. .......... 356/73.1 |
| 2011/0109086 A1 * | 5/2011 | Stiesdal ............................ 290/44 |
| 2011/0162554 A1 * | 7/2011 | Galic ............................... 105/49 |

* cited by examiner

WIND ENERGY INSTALLATION AND METHOD OF CONTROLLING THE OUTPUT POWER FROM A WIND ENERGY INSTALLATION

CROSS REFERENCE TO RELATED APPLICATIONS

This application is a continuation of U.S. Ser. No. 11/975,333 filed on Oct. 18, 2007 now U.S. Pat. No. 7,898,099 and which claims the benefits of European application No. 06021972.2 filed Oct. 19, 2006. All of the references are incorporated by reference herein in their entirety.

FIELD OF INVENTION

The present invention relates to a wind energy installation, i.e. a single wind turbine or a wind farm comprising a number of wind turbines. The invention further relates to a method of controlling the output power from such a wind energy installation to an electrical grid for which a nominal grid frequency is specified.

BACKGROUND OF THE INVENTION

Many wind energy installations are not stand alone installations provided for a single user but feed the generated electrical power into a grid which distributes the power to a large number of different users. As the power consuming devices of the users require electrical power within a certain parameter range, e.g., a specified nominal voltage and a specified nominal grid frequency, measures are necessary to ensure the stability of these grid parameters.

The grid parameters depend on a balance between the power fed into the grid by electrical power generating installations and the power consumed by the consumers. If the produced electrical power fed to the grid is less than the consumed power, the grid frequency drops. On the other hand, if the consumed power is less than the power fed into the grid, the grid frequency increases which could lead to malfunctions of the consumer's electrical devices.

As long as the fraction of electrical power generated by wind energy installations was relatively small compared to the fraction of electrical power generated by other power generating installations, it was not necessary for wind farms to react to variations in the grid frequency. However, as the fraction of electrical power fed into electrical grids by wind energy installations increases it becomes more and more important that these installations are capable of reacting to variations of the grid frequency.

EP 1 282 774 B1 describes controlling the output power of a wind energy generating plant such that it is constant as long as the grid frequency lies in the range between the nominal grid frequency and a threshold frequency which is three per mill higher than the nominal grid frequency. When the grid frequency increases by more than three per mill above the nominal frequency the output power of the plant is continuously reduced.

EP 1 467 463 A1 describes a wind farm and a method of operating the same. The wind farm is driven at a fixed power output, e.g., maximum total power output, while the grid frequency stays within a predetermined range. If, however, the grid frequency exceeds an upper boundary value of said range, the power output of the wind farm is reduced. If, on the other hand, the grid frequency undershoots a lower boundary value of the predetermined range, the power output is increased.

However, the threshold values defined in the prior art are somehow arbitrarily chosen and could lead to difficulties in reacting to deviations of the grid frequency if the grid frequency changes rather quickly.

SUMMARY OF INVENTION

It is therefore an objective of the present invention to provide a method of controlling the output power from a wind energy installation and a wind energy installation which allow a more sophisticated reaction to changes of the grid frequency.

This objective is solved by a method of controlling the output power from a wind energy installation and by a wind energy installation, e.g., a single wind turbine or a wind farm comprising a number of wind turbines.

In the inventive method of controlling the output power from a wind energy installation to an electrical grid with a specified nominal grid frequency, the output power is controlled as a function of the time derivative of the deviation of the grid frequency from the nominal frequency.

The inventive method not only provides the ability to react to a deviation of the grid frequency from the nominal frequency, but also to react differently depending on the rate of change in the grid frequency. A high rate of change means that a destabilisation of the grid is more likely than with a small rate of change so that a reaction can, e.g., take place when the rate of change exceeds a certain limit. Alternatively, a high rate of change could lead to a strong reaction whereas a low rate of change would only lead to a weak reaction.

As the rate of change of the grid frequency gives near the nominal frequency a better measure as to how likely a critical frequency limit will be reached or not than just looking at the deviation itself one can react in a more sophisticated manner and more specifically to grid frequency changes.

In addition to controlling the output power as a function of the time derivative of the frequency the output power can be controlled as a function of the deviation of the grid frequency from the nominal frequency. In other words, the control of output power can be based on the deviation of the grid frequency from the nominal frequency and, at the same time, on the rate of grid frequency change.

In addition, at least one threshold value for the grid frequency could be given which is different to the nominal grid frequency, i.e. higher or lower than the grid frequency, and the output power could be controlled as a function of the time derivative of the grid frequency and/or as a function of the deviation of the grid frequency from the nominal frequency only if the grid frequency is not between the nominal grid frequency and the threshold value. Then, no control at all needs to be done if the grid frequency is between the nominal frequency and the threshold value. Alternatively, the output power could be controlled only as a function of the time derivative of the grid frequency as long as the grid frequency is between the nominal grid frequency and the threshold value. When the grid frequency is not between the nominal grid frequency and the threshold value the output power would be controlled as a function of the time derivative of the frequency and, at the same time, as a function of the deviation of the grid frequency from the nominal frequency. This provides the possibility to react in a sophisticated way as long as the deviation of the grid frequency from the nominal frequency is small and to react in a more rigorous manner when as certain threshold is exceed or undershot. For example, if the threshold is higher than the nominal frequency and the grid frequency increases above the threshold, the power output can be reduced rather quickly with increasing grid frequency irrespective of the rate of change in the grid frequency. In other words, while within the limit given by the threshold value it may not be necessary to reduce the power further when the rat of change indicates that the grid frequency will return to the nominal frequency it might be necessary to reduce the power further as long as the threshold value is exceeded even if the derivative of the grid frequency indicates that the grid frequency will come closer to the nominal frequency again. In particular if the absolute value of the deviation from the nominal grid frequency is still rather high, it might be necessary to reduce output power irrespective of the rate and direction of change in the grid frequency.

An inventive wind energy installation, i.e. a single wind turbine or a wind farm with a number of wind turbines, comprises at least one wind driven generator comprising a generator electronics and being connected to a utility grid for delivering an output power to the utility grid, a frequency sensor which is designed and arranged such as to be able to measure the grid frequency present in the utility grid and to output a frequency signal representing the grid frequency, and a control unit which is connected to the generator for delivering a control signal and to the frequency sensor for receiving the frequency signal. The control unit is adapted to calculate the control signal such that an output power is delivered which depends on the time derivative of the grid frequency. The inventive wind energy installation is specially adapted to perform the inventive method. The advantages mentioned with respect to the inventive method are therefore achieved with the inventive wind energy installation, as well.

In a special implementation of the inventive wind energy installation the control unit is adapted to calculate the control signal such that an output power is delivered with depends on the deviation of the grid frequency from the nominal frequency, too.

The control unit may be adapted to include at least one threshold value for the grid frequency which differs from the nominal frequency, i.e. which is higher or lower than the nominal frequency, and to calculate a control signal for delivering an output power which is a function of the time derivative of the grid frequency and/or a function of the deviation of the grid frequency from the nominal frequency only if the grid frequency is not between the nominal grid frequency and the threshold value. In particular, the control unit could be adapted to calculate a control signal such that an output power is delivered which is only a function of the time derivative of the grid frequency as long as the grid frequency is between the nominal grid frequency and the threshold value. The control unit would be further adapted to calculate the control signal such that an output power is delivered which is a function of the time derivative of the grid frequency and, at the same time, a function of the deviation of the grid frequency from the nominal frequency when the grid frequency is not between the nominal frequency and the threshold value. In an important application, the threshold value will be higher than the nominal value for the grid frequency.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
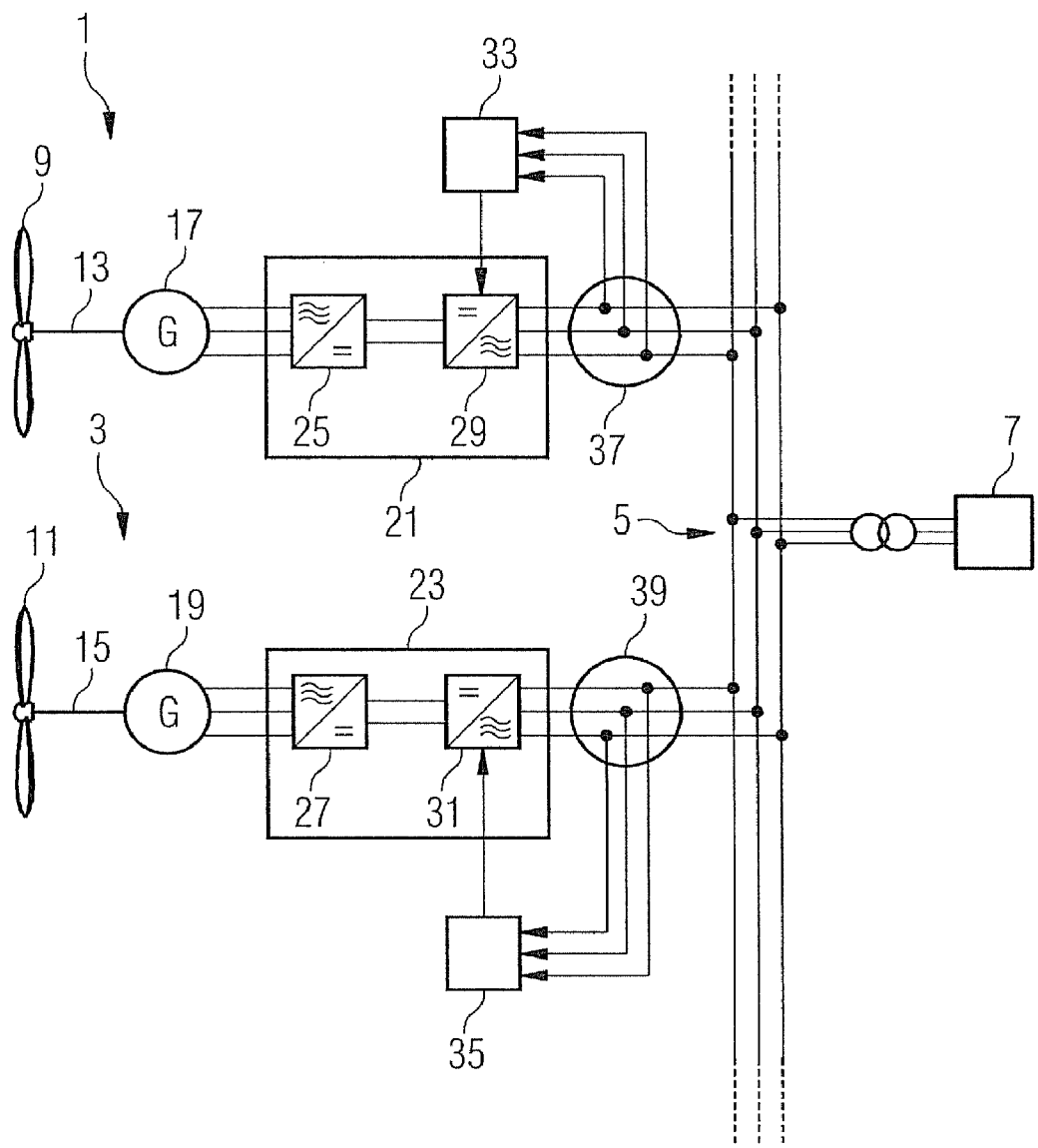
FIG. 1 schematically shows a first embodiment of an inventive wind energy installation.

The wind energy installation shown in FIG. 1 comprises a number of wind turbines two of which are shown in the figure. The wind turbines 1, 3 produce an electrical output power and are connected via an internal node 5 to an external utility grid 7. Although the first embodiment comprises more than one wind turbine, it can also be implemented for a single wind turbine.

The wind turbines 1, 3 are variable speed wind turbines, i.e., the rotational speed of the rotor 9, 11 is allowed to vary depending on the wind conditions.

Each wind turbine 1, 3 comprises a rotor 9, 11 with a shaft 13, 15 transmitting the torque of the wind driven turning rotor 9, 11 to an AC generator 17, 19 which transforms the mechanical power provided by the rotation of the shaft 13, 15 into electrical power. Although not shown in the Figure, the shaft 13, 15 may be divided into a rotor shaft extending from the rotor to an optional gearbox and an output shaft extending from the gearbox to the generator 17, 19. With the gearbox, a transmission of the rotor shafts' rotation to a different rotation of the output shaft with a certain transmission ratio can take place.

The AC generator comprises a generator electronics and may either by a synchronous generator or an asynchronous generator. In a synchronous generator, a rotor rotates with the same rotational frequency as the rotating magnetic field produced by a stator of the generator, or with an integer relationship with the frequency of the rotating magnetic field, depending on the number of pole pairs present in the rotor. In contrast thereto, in an asynchronous generator the rotational frequency of the stator's magnetic field is more or less independent from the rotational frequency of the rotor. The difference in rotational frequency of the rotor and the stator is described by the slip of the asynchronous generator.

In the embodiment depicted in FIG. 1, synchronous generators are used in the wind turbines 1, 3 for producing the electrical power. The wind turbines 1, 3 are connected to the internal node 5 via frequency converters 21, 23 which are part of the generator electronics and which convert the frequency of the electrical power delivered by the generators 17, 19 into an electrical power having a fixed frequency which corresponds to the frequency as the grid 7. Each frequency converter 21, 23 comprises a rectifier 25, 27 which converts the amplifying current delivered by the generator 17, 19 into a direct current and an inverter which converts the direct current back into an amplifying current with the frequency of the grid 7.

Control units 33, 35 are present which are connected to a frequency sensor 37, 39 for receiving a frequency signal and to the inverter 29, 31 for delivering the control signal. The frequency sensor is present in the grid so as to allow the measurement of the actual grid frequency of the external grid 7. Although the frequency sensor 37, 39 is shown to be placed directly behind the output of the frequency converter 21, 23, it could also be placed behind the internal node 5 or even in the external grid 7. However, as the frequency at the internal node 5 matches the frequency in the external grid 7 the frequency measured by the frequency sensor 37, 39 at the output of the frequency converter 21, 23 is identical to the frequency in the external grid 7.

The control unit 33, 35 is adapted to produce a control signal depending on the measured grid frequency. The control signal represents the output power, in particular the active output power, to be output by the inverter 21, 23. In addition, the control signal can also be adapted to represent a special power factor which is a measure for the ratio of active power to the sum of active and reactive power.

In the present invention, the control unit 33, 35 is adapted to provide a control signal such that the output power of the wind turbine 1, 3 depends on the deviation of the measured grid frequency from a nominal grid frequency (e.g., 50 Hz in Germany or 60 Hz in the US) as well as from the time derivative of the grid frequency. The time derivative is a measure for the ratio of frequency change.

Figure 2:
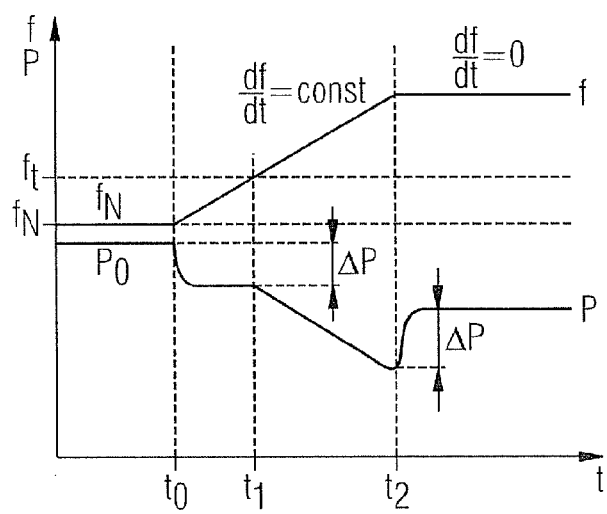
FIG. 2 shows the grid frequency and the output power of the wind energy installation as a function of time.
Figure 4:
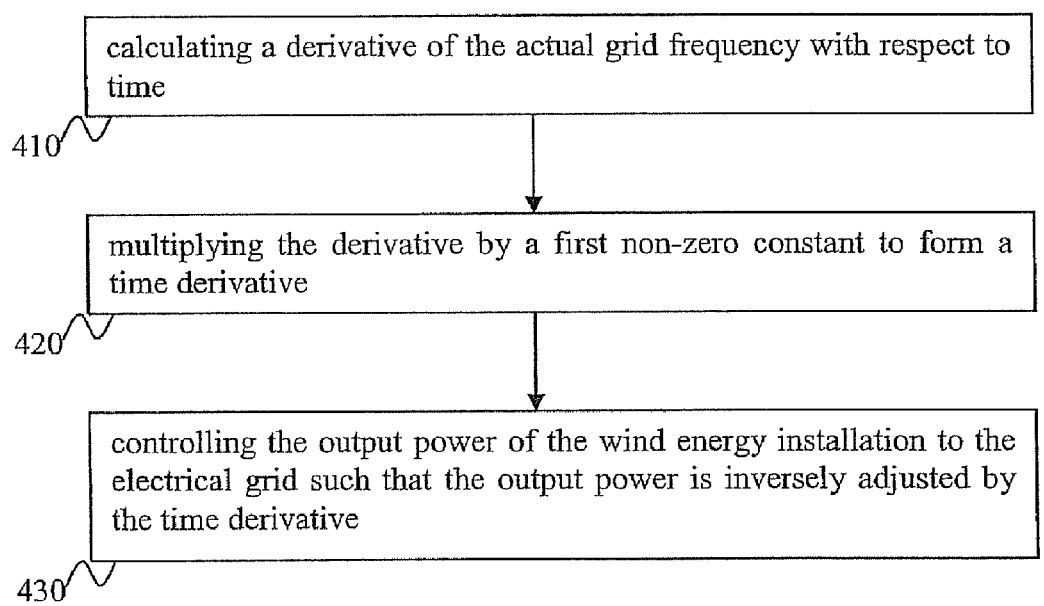
FIG. 4 shows an algorithm according the present disclosure.

The control process in the control unit 33, 35 will now be described in more detail with reference to FIG. 2 and FIG. 4. FIG. 2 shows the grid frequency f and the output power P as a function of time t. It further shows the value of the nominal frequency $f_N$ and the value of a frequency threshold $f_t$ which lies, in the present example, above the nominal frequency.

In the present example, the output power is given by a sum of two terms. The first term is proportional to the deviation of the grid frequency from the nominal frequency while the second term is proportional to the time derivative of the grid frequency.

$$P = K_1(f - f_N) + K_2 \frac{df}{dt}$$

The proportionality constant $K_1$ of the term which is linear in the deviation of the grid frequency from the nominal frequency is zero as long as the grid frequency f does not exceed the frequency threshold $f_t$ shown in FIG. 2 and non-zero and negative when the frequency threshold $f_t$ is exceeded. The constant $K_2$ is greater than zero 420. $K_2$ is multiplied by df/dt which is the derivative of the grid frequency with respect to time 410, 420.

After the threshold $f_t$ is exceeded the constant $K_1$ becomes non-zero and negative. As can be seen from FIG. 2, this control function leaves the output power constant ($P_o$) when the grid frequency f matches the nominal frequency $f_N$, i.e. for times before $t_0$ in FIG. 2. At $t_0$ the net frequency begins to increase linearly, i.e. the time derivative is constant and greater than 0. At the moment the net frequency begins to increase, the power falls sharply by an amount ΔP and is then constant until $t_1$. At the time $t_1$ the grid frequency exceeds the threshold value which means that now the constant $K_2$ used in the term which depends linearly on the difference of the frequency from the nominal frequency becomes negative, so that the output power P begins to fall linearly at $t_1$ (note that the time derivative of the grid frequency is still constant) 430.

Next, at the time $t_2$, the grid frequency does not increase further and becomes constant at a high level. For the term which depends linearly on the difference between the grid frequency and the nominal frequency $f_N$ this means to become constant, too. In addition, as the time derivative the grid frequency becomes 0 at $t_2$ the output power is increased at $t_2$ by the same amount ΔP it was decreased at the $t_0$.

Compared to the control of the output power in the state of the art, i.e., to control the output power as a function of the deviation of the grid frequency from the nominal frequency $f_N$ the output power is lower between $t_0$ and $t_2$ whereas it is the same after $t_2$. Due to the derivative term in the above formula the control is more sensitive to rapidly increasing grid frequencies than the state of the art control methods. If, e.g. the linear increase of the grid frequency between $t_0$ and $t_2$ would be steeper than shown in FIG. 2, the power drop at $t_0$ would be larger than shown in FIG. 2. Moreover, if the grid frequency would not only increase linearly but, e.g., quadratically, the power would fall further between $t_0$ and $t_1$. In other words, the more rapidly the grid frequency increases, the more rapidly the output power is reduced. Therefore, with the inventive method, rapidly increasing grid frequencies, which could lead to intolerable net frequencies in short time, are more rapidly counteracted than with the control methods in the state of the art.

Although a special control function has been described with respect to FIG. 2, in order to explain the invention, the control function may depend other than linearly on the deviation of the grid frequency from the nominal frequency and other then linearly from the time derivative of the grid frequency. In addition, a threshold $f_t$, as described with respect to FIG. 2, is not necessarily required. For the control function, described with respect to FIG. 2, this means that the term which is linear in the deviation of the grid frequency from the nominal frequency could already be non-zero at $t_0$. Furthermore, although only a reaction for a grid frequency increasing above the nominal frequency is shown in FIG. 2, a reaction could also be present if the grid frequency falls below the nominal frequency $f_N$ or a lower threshold value, e.g., the output power could rise.

Figure 3:
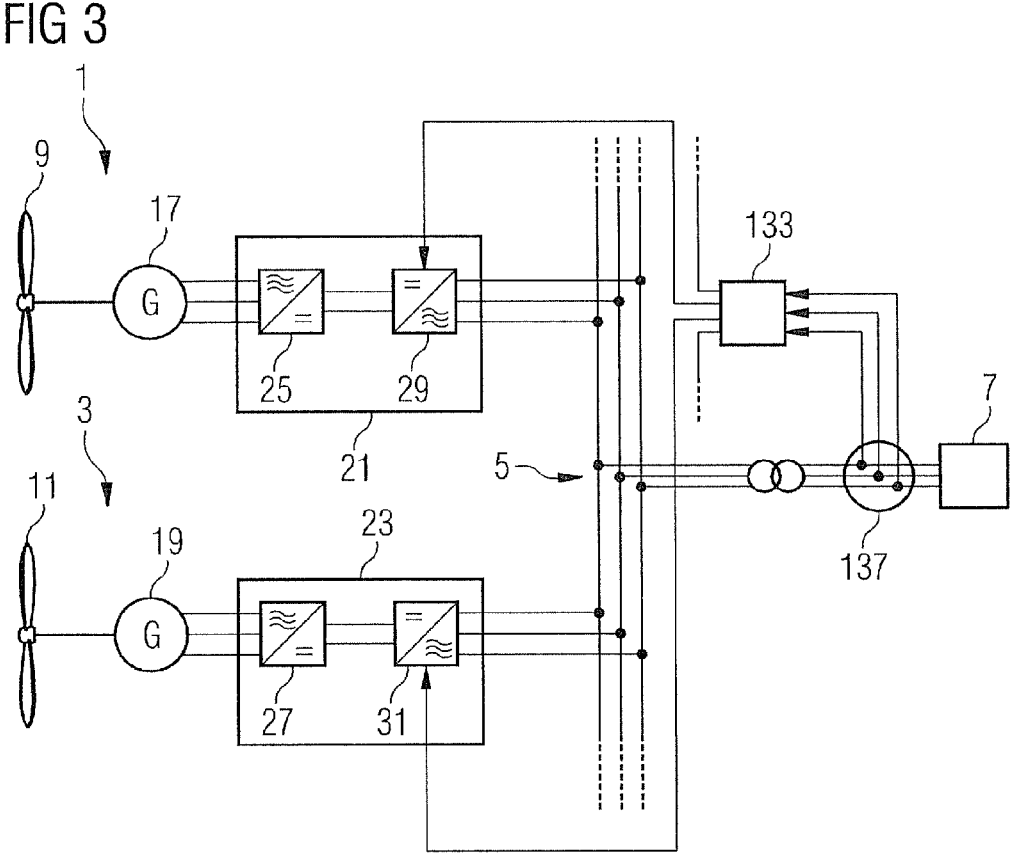
FIG. 3 shows a second embodiment of an inventive wind energy installation.

A second embodiment of the inventive wind energy installation is shown in FIG. 3. Each wind turbine 1, 3 of the second embodiment corresponds substantially to the wind turbines described with respect to the first embodiment, shown in FIG. 1. The only substantial difference from the first embodiment is that not each single wind turbine 1, 3 is equipped with a control unit for controlling the output power as a function of the time derivative of the grid frequency in the utility grid 7. Instead, a central control unit 133 is present at the wind farm which delivers individual control signals for each wind turbine 1, 3 of the wind farm. Furthermore, the frequency sensor 137 is placed at the output node of the wind farm rather than at the inverter outputs.

The control method performed by the central controller 133 is the same as the control method performed by the controllers 33, 35 of the first embodiment and will not be described again. However, the centralised control unit 133 offers the possibility for differently reducing the output power of different wind turbines as a reaction of e.g. an increasing grid frequency. If, for example, the grid frequency increases and, as a consequence, the output power is reduced by the controller 133, it is possible to reduce output power of only some of the wind turbines and not reducing the output power of the other wind turbines. This could be useful if, e.g. some wind turbines operate at rated output power and other wind turbines operate at an output power which is lower than the rated output power. In this case, wear of the wind turbines which operate at rated output power is usually higher than the wear of wind turbines which are operated at a lower output power than rate output power. Therefore, in order to reduce the output power of the wind faun, it becomes possible with the second embodiment to only reduce the output power of those wind turbines which are operated at the rated output power. By this measure the wear of these wind turbines can be reduced.

The invention claimed is:

1. A method of controlling the output power from a wind energy installation to an electrical grid with a specified nominal grid frequency, comprising:
    sensing an actual grid frequency; and
    controlling the output power of the wind energy installation to the electrical grid as a function of the time derivative of the actual grid frequency.

2. The method as claimed in claim 1, wherein the output power is further controlled as a function of a deviation of the actual grid frequency from the specified nominal frequency.

3. The method as claimed in claim 2, wherein a threshold value for the grid frequency that is different than the nominal grid frequency and where the output power is further controlled as a function of the deviation of the actual grid frequency from the specified nominal frequency only when the grid frequency is not between the nominal grid frequency and the threshold value.

4. The method as claimed in claim 3, wherein the output power is controlled as a function of the time derivative of the grid frequency when the grid frequency is between the specified nominal grid frequency and the threshold value, and the output power is controlled as a function of the time derivative of the grid frequency and as a function of the deviation of grid frequency from the nominal frequency when the grid frequency is not between the nominal grid frequency and the threshold value.

5. The method as claimed in claim 2, wherein controlling the output power as a function of the time derivative of the grid frequency comprises:

calculating a derivative of the actual grid frequency with respect to time; and multiplying the derivative by a first non-zero constant to form the time derivative.

6. A wind energy installation connected to a utility grid for delivering output power to the utility grid, comprising:

a wind driven generator;

a generator electronics;

a frequency sensor constructed and arranged to measure the grid frequency present in the utility grid and to output a frequency signal representing the grid frequency; and a control unit connected to the generator electronics for delivering a control signal and connected to the frequency sensor for receiving the frequency signal and is adapted to calculate the control signal such that the output power delivered to the grid depends on the time derivative of the grid frequency.

7. The wind energy installation as claimed in claim 6, wherein the control unit is adapted to calculate the control signal such that an output power is delivered that further depends on the deviation of grid frequency from a nominal frequency of the utility grid.

8. The wind energy installation as claimed in claim 6, wherein the control unit is adapted to include a threshold value for the grid frequency that is different from the nominal grid frequency and to calculate a control signal for delivering an output power that is a function of the time derivative of the grid frequency and as a function of the deviation of the grid frequency from the nominal frequency only when the grid frequency is not between the nominal grid frequency and the threshold value.

9. The wind energy installation as claimed in claim 8, wherein the control unit is adapted to calculate the control signal such that an output power is delivered which is only a function of the time derivative of the grid frequency as long as the grid frequency is between the nominal grid frequency and the threshold value and such that an output power is delivered which is a function of the time derivative of the grid frequency and a function of the deviation of grid frequency from the nominal frequency when the grid frequency is not between the nominal grid frequency and the threshold value.

* * * * *